(12) United States Patent
Liu et al.

(10) Patent No.: US 11,947,438 B2
(45) Date of Patent: Apr. 2, 2024

(54) OPERATION AND MAINTENANCE SYSTEM AND METHOD

(71) Applicant: ZTE CORPORATION, Shenzhen (CN)

(72) Inventors: Lixia Liu, Shenzhen (CN); Feng Ji, Shenzhen (CN); Tao Wen, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 628 days.

(21) Appl. No.: 17/256,618

(22) PCT Filed: Jun. 28, 2019

(86) PCT No.: PCT/CN2019/093812
§ 371 (c)(1),
(2) Date: Dec. 28, 2020

(87) PCT Pub. No.: WO2020/001642
PCT Pub. Date: Jan. 2, 2020

(65) Prior Publication Data
US 2021/0271582 A1    Sep. 2, 2021

(30) Foreign Application Priority Data
Jun. 28, 2018    (CN) .......................... 201810689427.5

(51) Int. Cl.
*G06F 11/34*   (2006.01)
*G06N 5/02*    (2023.01)
*G06N 20/00*   (2019.01)

(52) U.S. Cl.
CPC ...... *G06F 11/3447* (2013.01); *G06F 11/3428* (2013.01); *G06F 11/3452* (2013.01); *G06N 5/02* (2013.01); *G06N 20/00* (2019.01)

(58) Field of Classification Search
CPC ............. G06F 11/3447; G06F 11/3428; G06F 11/3452; G06N 20/00; G06N 5/02
(Continued)

(56) References Cited

U.S. PATENT DOCUMENTS

| 10,410,135 | B2 * | 9/2019 | Shumpert | ............... G06N 20/00 |
| 2017/0134237 | A1 * | 5/2017 | Yang | .................. H04L 43/0876 |
| 2017/0345015 | A1 * | 11/2017 | Ranganna | ............. H04L 43/091 |

FOREIGN PATENT DOCUMENTS

| CN | 103346906 A | 10/2013 |
| CN | 105204978 A | 12/2015 |

(Continued)

OTHER PUBLICATIONS

ZTE Corporation, International Search Report, PCT/CN2019/093812, dated Sep. 26, 2019, 4 pgs.
(Continued)

*Primary Examiner* — Aditya S Bhat
(74) *Attorney, Agent, or Firm* — Li & Cai Intellectual Property (USA) Office

(57) ABSTRACT

Embodiments of the present disclosure provide an operation and maintenance system and method. The operation and maintenance system comprises a plurality of interconnected modules including: a data acquisition module, a data storage module, an exception and fault labeling module, an automatic model training and assessment module, an operation and maintenance management and task execution module, and a result checking module.

15 Claims, 5 Drawing Sheets

(58) Field of Classification Search
USPC .......................................................... 702/186
See application file for complete search history.

(56) References Cited

FOREIGN PATENT DOCUMENTS

| | | |
|---|---|---|
| CN | 106095639 A | 11/2016 |
| CN | 106452829 A | 2/2017 |
| CN | 106600115 A | 4/2017 |
| CN | 106649034 A | 5/2017 |
| CN | 106844138 A | 6/2017 |
| CN | 107332685 A | 11/2017 |
| CN | 107358300 A | 11/2017 |
| CN | 107577588 A | 1/2018 |
| CN | 108038049 A | 5/2018 |
| CN | 108173671 A | 6/2018 |

OTHER PUBLICATIONS

ZTE Corporation, Extended European Search Report, EP 19826453.3, dated Jun. 25, 2021, 13 pgs.
ZTE Corporation, CN First Office Action with English Translation, CN 2018106894275, dated Jul. 5, 2022, 12 pgs.
Zhong, Xiangqiong, "Design of big data intelligent operation and maintenance system based on cloud computing", Information & Communications, 2016, 3 pgs.
Hua, Aibing, "Research and implementation of intelligent O&M management system based on big data", Information & Communications, 2017, 3 pgs.

* cited by examiner

OPERATION AND MAINTENANCE SYSTEM AND METHOD

CROSS-REFERENCE TO RELATED APPLICATIONS

The present application is a national phase entry of PCT Patent Application No. PCT/CN2019/093812, filed Jun. 28, 2019, which claims the benefit of priority to Chinese Patent Application No. 201810689427.5, filed Jun. 28, 2018, each of which is incorporated herein by reference in its entirety.

TECHNICAL FIELD

Embodiments of the present disclosure relate to, but are not limited to, an operation and maintenance system and method.

BACKGROUND

At present, with the development of cloud computing and big data technologies, a variety of massive data is accumulated in various industries in actual application processes. In addition to necessary data of an application system itself, there is also log data of an underlying storage medium, network transmission, an operating system, a database, a file system, a management system, and the like related to the application system. Such data records changes of a system during normal operation and abnormal operation of the system, before a fault occurs, after a fault occurs, chain reactions of associated component, and the like, and is a basis for operation and maintenance personnel for exception detection, fault definition, root cause analysis, and fault prediction. However, as ever-growing complex inter-component logs record a variety of operation and maintenance data in various forms, manual stepwise troubleshooting, script-assisted positioning, log retrieval, simple statistical analysis, threshold monitoring, and the like as in the past cannot satisfy current basic requirements of operation and maintenance for timeliness and functionality any more.

At present, there are several types of methods in the field of operation and maintenance. One is using manual experience. An operation and maintenance engineer quickly locates a fault by searching for and checking a log level (such as DEBUG, WARNING, ERROR, INFO, or FATAL) of a log or an error code (a specific code such as 400, ORA-01500) with reference to rich operation and maintenance experience. Such an operation and maintenance method is relatively effective in mature and stable small enterprises, but is inadequate in a current large-scale complex cluster with continuously superimposed new software because of a huge amount of log data, a variety of log types, and requirements for efficient and effective operation and maintenance. Another one is using a log analysis tool. Such a tool initially focuses on analyzing an operation log of a user, and performs system optimization, precise marketing, and the like based on learning of operating habits and behavioral preferences of the user. Later, application of the tool is further extended to operation and maintenance. However, a main function of such tools is to provide log retrieval, simple statistical analysis, and visual display (such as unique visitors (UVs) and page views (PVs)) after collecting, parsing, and storing logs in a unified manner. Such tools also update an underlying architecture with the development of cloud computing and big data, and can meet requirements for fast retrieval, simple statistical analysis, real-time monitoring, and the like on complex, diverse, and massive logs, but cannot meet advanced operation and maintenance requirements such as automatic exception detection, rapid fault location, and early fault warning in the field of operation and maintenance.

How to implement intelligent operation and maintenance based on cloud computing and big data by using artificial intelligence technologies is actively explored by various medium- and large-scale enterprises at present and in a relatively long term in the future.

SUMMARY

The following is a summary of the subject matter detailed in the present disclosure. The summary is not intended to limit the scope of the claims.

Embodiments of the present disclosure provide an operation and maintenance system, including: a data acquisition module, a data storage module, an exception and fault labeling module, an automatic model training and assessment module, an operation and maintenance management and task execution module, and a result checking module that are interconnected. The data acquisition module is configured to acquire a plurality of types of log source data needed by the operation and maintenance system, and store the plurality of types of log source data in the data storage module. The data storage module is configured to store the log source data, an operation and maintenance result, a labeling result, a model, and a knowledge base. The exception and fault labeling module is configured to continuously perform exception and fault labeling on a part of source data in the data storage module, and store a labeling result in the data storage module. The automatic model training and assessment module is configured to continuously generate and update a plurality of types of operation and maintenance models and knowledge bases, and store the plurality of types of operation and maintenance models and knowledge bases in the data storage module. The operation and maintenance management and task execution module is configured to set and execute an operation and maintenance task, call an operation and maintenance model and a knowledge base, and store and output an operation and maintenance result. The result checking module is configured to check an exception and a fault outputted from the operation and maintenance management and task execution module, and output an exception and a fault confirmed through checking to the exception and fault labeling module.

Embodiments of the present disclosure further provide an operation and maintenance method, including: acquiring, by a data acquisition module, a plurality of types of log source data needed by an operation and maintenance system, and storing the plurality of types of log source data in a data storage module; storing, by the data storage module, the log source data, an operation and maintenance result, a labeling result, a model, and a knowledge base; continuously performing, by an exception and fault labeling module, exception and fault labeling on a part of source data in the data storage module, and storing a labeling result in the data storage module; continuously generating and updating, by an automatic model training and assessment module, a plurality of types of operation and maintenance models and knowledge bases, and storing the plurality of types of operation and maintenance models and knowledge bases in the data storage module; setting and executing, by an operation and maintenance management and task execution module, an operation and maintenance task, calling an operation and maintenance model and a knowledge base, and storing and outputting an operation and maintenance result; and checking, by a result checking module, an exception and a fault outputted from the operation and maintenance management and task execution module, and outputting an exception and a fault confirmed through checking to the exception and fault labeling module.

After the accompanying drawings and detailed description are read and understood, other aspects of the present disclosure can be understood.

BRIEF DESCRIPTION OF THE DRAWINGS

The accompanying drawings are used to provide further understanding of the technical solutions of the present disclosure, and constitute a part of the specification, which are used to explain the technical solutions of the present disclosure in combination with the embodiments of the present disclosure, and do not constitute a limitation to the technical solutions of the present disclosure.

DETAILED DESCRIPTION

The following describes embodiments of the present disclosure in detail with reference to the accompanying drawings. It should be noted that, provided that no conflict is caused, the embodiments in the present disclosure or the features in the embodiments may be mutually combined.

The steps shown in the flowcharts in the accompanying drawings may be performed in, for example, a computer system having a group of computer-executable instructions. In addition, although a logic order is shown in the flowcharts, in some cases, the shown or described steps may be performed in an order different from the order herein.

To implement intelligent operation and maintenance based on cloud computing and big data by using artificial intelligence technologies, embodiments of the present disclosure provide a novel operation and maintenance system and method, to ensure that the entire operation and maintenance system can achieve adaptive updating, self-improvement, and gradual evolution, thereby significantly improving efficiency of operation and maintenance.

First Embodiment

Figure 1:
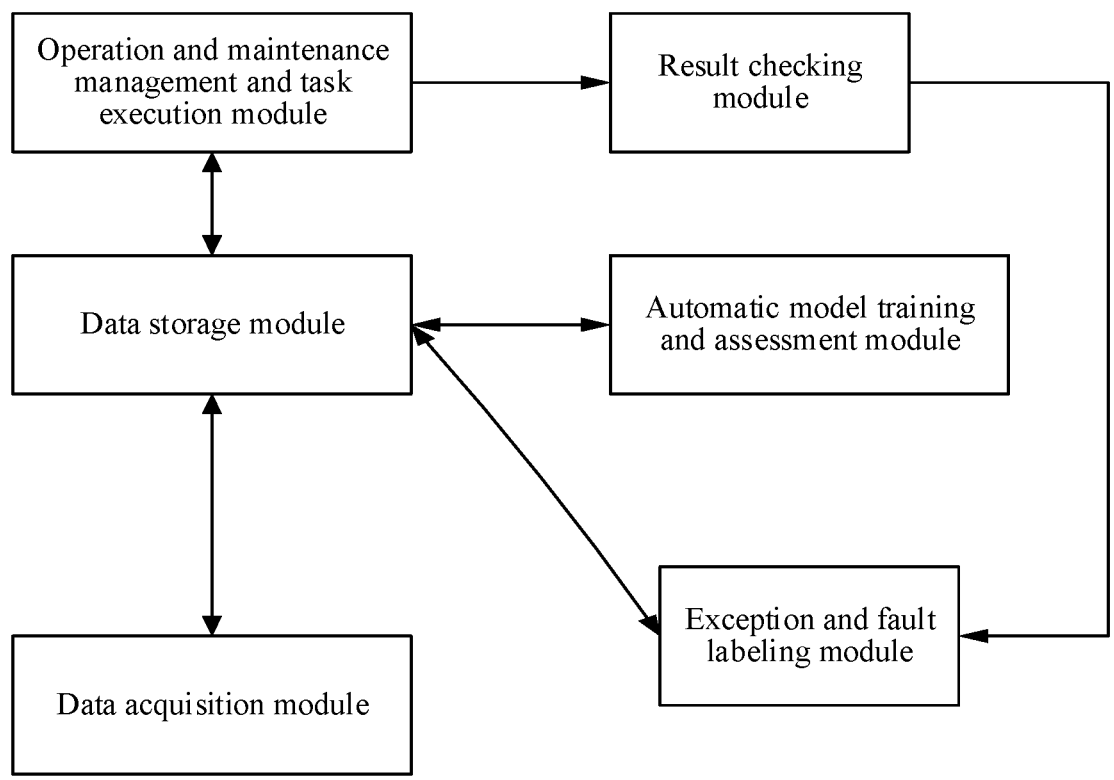
FIG. 1 is a schematic structural diagram of an operation and maintenance system according to a first embodiment of the present disclosure.

FIG. 1 is a schematic structural diagram of an operation and maintenance system according to the first embodiment of the present disclosure. As shown in FIG. 1, the operation and maintenance system includes: a data acquisition module, a data storage module, an exception and fault labeling module, an automatic model training and assessment module, an operation and maintenance management and task execution module, and a result checking module that are interconnected.

The data acquisition module is configured to acquire a plurality of types of log source data needed by the operation and maintenance system, and store the plurality of types of log source data in the data storage module.

The data storage module is configured to store the log source data, an operation and maintenance result, a labeling result, a model, and a knowledge base.

The exception and fault labeling module is configured to continuously perform exception and fault labeling on a part of source data in the data storage module, and store a labeling result in the data storage module.

The automatic model training and assessment module is configured to continuously generate and update a plurality of types of operation and maintenance models and knowledge bases, and store the plurality of types of operation and maintenance models and knowledge bases in the data storage module.

The operation and maintenance management and task execution module is configured to set and execute an operation and maintenance task, call an operation and maintenance model and a knowledge base, and store and output an operation and maintenance result.

The result checking module is configured to check an exception and a fault outputted from the operation and maintenance management and task execution module, and output an exception and a fault confirmed through checking to the exception and fault labeling module.

In this way, an exception and a fault can be automatically detected and outputted while basic operation and maintenance requirements are met, to ensure that the entire operation and maintenance system can achieve adaptive updating, self-improvement, and gradual evolution, thereby significantly improving efficiency of operation and maintenance.

In an embodiment, the plurality of types of log source data acquired by the data acquisition module include an application system log, an operating system resource status log, exception log data, streaming log data, a detailed operation and maintenance record, and third-party labeling data.

For the application system log and the operating system resource status log, the data acquisition module uses a data acquisition mode of scheduled scanning and batch transmission. For the exception log data and the streaming log data, the data acquisition module uses a data acquisition mode of real-time acquisition and real-time transmission. For the detailed operation and maintenance record and the third-party labeling data, the data acquisition module uses the data acquisition mode of scheduled scanning and batch transmission.

The source data on which the exception and fault labeling module performs exception and fault labeling includes: the detailed operation and maintenance record and the third-party labeling data stored in the data storage module, the exception and the fault confirmed through checking and outputted from the result checking module, and data used by the automatic model training and assessment module for training, test, and verification.

In an embodiment, manners in which the exception and fault labeling module performs exception and fault labeling include: a manual manner, a semi-manual manner, a semi-supervised learning manner, and a transfer learning manner.

The manual manner means labeling a detailed operation and maintenance record extracted as required from the data storage module, according to a fault occurrence module, a fault type, and a fault cause.

The semi-manual manner means labeling the exception and the fault confirmed through checking and outputted from the result checking module, according to the fault occurrence module, the fault type, and the fault cause.

The semi-supervised learning manner means labeling the data used by the automatic model training and assessment module for training, test, and verification, by using a semi-supervised learning algorithm and some labeling samples that have been labeled.

The transfer learning manner includes learning from similar third-party labeling data by using a transfer learning technology, to generate labeling data needed by the operation and maintenance system.

In an embodiment, manners in which the automatic model training and assessment module generates and updates the plurality of types of operation and maintenance models and knowledge bases include: real-time data processing modeling and assessment, and batch data processing modeling and assessment.

The real-time data processing modeling and assessment includes extracting real-time log data from a real-time database in the data storage module, processing the data according to a real-time task requirement, sorting the data in chronological order, performing time segmentation on the data according to a specific time window, and detecting and extracting an exception mode by using simple relationship determining and statistical analysis.

The batch data processing modeling and assessment includes selecting single model training and assessment, integrated model training and assessment, and incremental model training and assessment for the detected and extracted exception mode, according to different operation and maintenance tasks and labeling data preparation, to generate the plurality of types of operation and maintenance models and knowledge bases.

The single model training and assessment includes: selecting an appropriate algorithm from a supervised model, an unsupervised model, and a semi-supervised model according to a task type, exception and fault labeling data, and training, test, and verification data, to perform training and assessment to generate a single model.

The integrated model training and assessment includes: using an appropriate integration mode for a plurality of single models to obtain a stable optimal result, in a case that a result of the single model training and assessment is unstable.

The incremental model training and assessment includes: performing model parameter updating, model retraining, and assessment updating operations on an existing operation and maintenance model after arrival of new log data.

In an embodiment, the plurality of types of operation and maintenance models and knowledge bases include: a real-time model, a general model, a knowledge base, and an incremental model.

The real-time model includes: a simple exception rule and a static threshold parameter detected in log data in a real-time computing scenario.

The general model includes: an algorithm and a corresponding parameter formed after the single model training and assessment, a dynamic threshold that changes with time and data, and an integration framework and a corresponding algorithm and parameter formed after the integrated model training and assessment in a batch computing scenario.

The knowledge base includes: a complex rule, an association relationship, a link propagation graph, a knowledge graph, and a fault tree detected in each stage of comprehensive model training and assessment.

The incremental model includes: model parameter adjustment and model type adjustment for the existing operation and maintenance model to adapt to new data, and the incremental model includes both an increment of the single model and an increment of an integrated model.

The technical solution provided in the first embodiment of the present disclosure is described below in detail through a specific embodiment.

Second Embodiment

Figure 2:
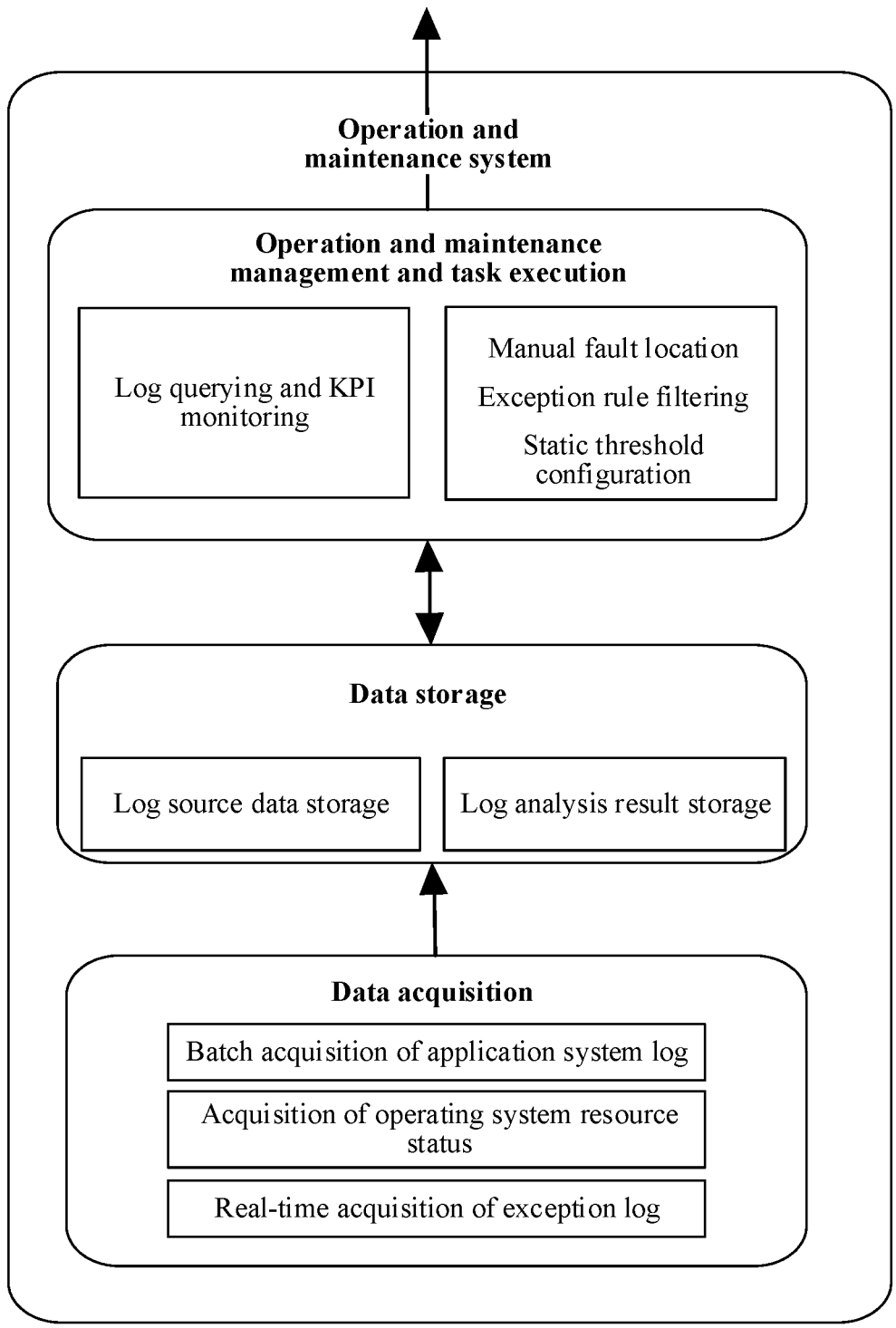
FIG. 2 is a schematic structural diagram of an operation and maintenance system in the existing technology.
Figure 3:
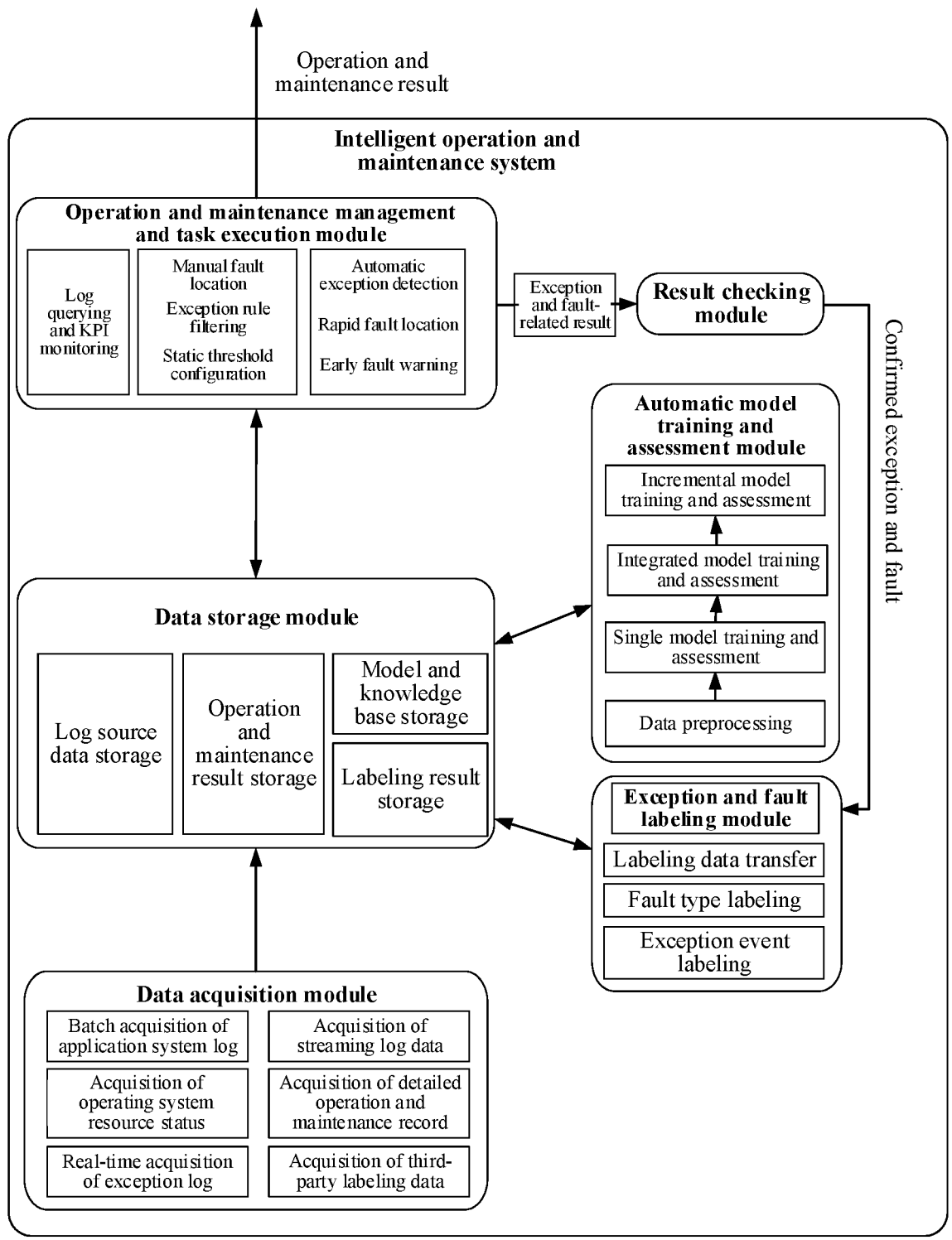
FIG. 3 is a schematic structural diagram of an operation and maintenance system according to a second embodiment of the present disclosure.

FIG. 2 is a schematic structural diagram of an operation and maintenance system in the existing technology, and FIG. 3 is a schematic structural diagram of an operation and maintenance system according to the second embodiment of the present disclosure. As shown in FIG. 2 and FIG. 3, the operation and maintenance system includes: a data acquisition module, a data storage module, an automatic model training and assessment module, and an operation and maintenance management and task execution module; and further includes: an exception and fault labeling module and a result checking module.

The data acquisition module is configured to acquire a plurality of types of log source data needed by an intelligent operation and maintenance system, and store the plurality of types of log source data in the data storage module.

The data acquisition module mainly acquires a plurality of types and forms of log data. In addition to batch acquisition of a common application system log, acquisition of an operating system resource status log, and real-time acquisition of exception log, acquisition of streaming log data, acquisition of a detailed operation and maintenance record, and acquisition of third-party labeling data are added.

In an embodiment, the data acquisition module runs a data acquisition interface configuration wizard independently. The wizard starts a corresponding acquisition scheme according to a rate and a data type of to-be-acquired data. Three different acquisition schemes are preset in the wizard: 1) for both the exception log data and the streaming log data, a data acquisition mode of real-time acquisition and real-time transmission is used, and acquired data is directly transmitted to a real-time memory database in the data storage module; 2) for both the detailed operation and maintenance record and the third-party labeling data, a data acquisition mode of scheduled scanning and batch transmission is used, and acquired data is directly transmitted to a distributed database in the data storage module; and 3) for both the application system log and the operating system resource status log, the data acquisition mode of scheduled scanning and batch transmission is used, but data acquired in this case is directly stored in a distributed file system in the data storage module.

The data storage module is configured to store necessary data such as the log source data, an operation and maintenance result, a labeling result, a model, and a knowledge base for the system.

The data storage module mainly stores log data, an exception and fault labeling result, a plurality of types of models and knowledge bases, and the like.

In an embodiment, the data storage module mainly stores log source data, a log analysis result, an exception and fault labeling result, and a plurality of types of models and knowledge bases. Storing intermediate result data of other modules in the data storage module according to requirements is also acceptable. Compared with an ordinary operation and maintenance system, this module adds storage of an exception and fault labeling result and storage of models and knowledge bases needed by the intelligent operation and maintenance system. A plurality of types of data may be stored in a distributed and classified manner according to a data type, a data form, and a data acquisition rate. For example, unstructured and semi-structured application system logs and operating system resource status log source data may be stored in a distributed file system; a detailed operation and maintenance record and third-party labeling data may be stored in a distributed database; and exception and streaming data acquired in real time may be stored in a memory database first, and then, it is determined whether to transfer and store the exception and streaming data to the distributed file system or the distributed database according to requirements.

The exception and fault labeling module is configured to continuously perform exception and fault labeling on a part of source data in the data storage module, and store a labeling result in the data storage module.

A part of source data in the exception and fault labeling module includes: the detailed operation and maintenance record, the exception and the fault confirmed through checking and outputted from the result checking module, the third-party labeling data, and data used by the automatic model training and assessment module for training, test, and verification.

Manners in which the exception and fault labeling module performs exception and fault labeling include: a manual manner, a semi-manual manner, a semi-supervised learning manner, and a transfer learning manner. Specific operation manners are as follows. The manual manner includes extracting a detailed operation and maintenance record from data storage as required, and labeling data according to a fault occurrence module, a fault type, and a fault cause. The semi-manual manner includes labeling, according to the fault occurrence module, the fault type, and the fault cause, the exception and the fault confirmed through manual checking and outputted from the result checking module. The semi-supervised learning manner includes labeling data that is not labeled (the data used by the automatic model training and assessment module for training, test, and verification), by using a semi-supervised learning algorithm and some labeling samples that have been labeled. The transfer learning manner includes learning from similar third-party labeling data by using a transfer learning technology, to generate labeling data (the data used by the automatic model training and assessment module for training, test, and verification) needed by the operation and maintenance system.

The automatic model training and assessment module is configured to continuously generate and update a plurality of types of operation and maintenance models and knowledge bases, and store the plurality of types of operation and maintenance models and knowledge bases in the data storage module.

Manners in which the automatic model training and assessment module continuously generates and updates the plurality of types of operation and maintenance models and knowledge bases include: real-time data processing modeling and assessment, and batch data processing modeling and assessment. The real-time data processing modeling and assessment includes: extracting real-time log data from a real-time database in the data storage module, processing the data according to a real-time task requirement, for example, sorting the data in chronological order, performing time segmentation on the data according to a specific time window, and then detecting and extracting an exception mode by using simple relationship determining, statistical analysis, and the like. The batch data processing modeling and assessment is that, for example, model training and assessment methods that can be selected are classified as single model training and assessment, integrated model training and assessment, and incremental model training and assessment according to different operation and maintenance tasks and labeling data preparation.

A main objective of the automatic model training and assessment module is to generate and update a real-time model, a general model, a knowledge base, and an incremental model that need to be called when the operation and maintenance management and task execution module performs automatic exception detection, fast fault location, and early fault warning. The automatic model training and assessment module is divided into four sub-modules for data processing, single model training and assessment, integrated model training and assessment, and incremental model training and assessment. The sub-modules all have different effects and functions. Different methods in each sub-module are selected sequentially according to an operation and maintenance task and data quality for data preprocessing, model training, and model assessment.

The single model training and assessment includes: selecting an appropriate algorithm from a supervised model, an unsupervised model, and a semi-supervised model according to a task type, exception and fault labeling data, and training, test, and verification data. For example, an exception mode detection task has a small quantity of samples due to a variety of exception modes and a relatively low occurrence frequency, and therefore, is generally based on the unsupervised model. Moreover, fault location and early fault warning are generally based on the supervised model and supplemented by the semi-supervised model.

The integrated model training and assessment includes: using an appropriate integration mode for a plurality of single models to obtain a stable optimal result in a case that a result of the single model training and assessment is unstable.

The incremental model training and assessment includes: performing update operations, such as model parameter updating, model retraining, and assessment updating, on an existing operation and maintenance model after arrival of new log data.

The plurality of types of operation and maintenance models and knowledge bases include: a real-time model, a general model, a knowledge base, and an incremental model. The real-time model includes: a simple exception rule, a static threshold parameter, and the like detected in log data in a real-time computing scenario. The general model includes: an algorithm and a corresponding parameter formed after the single model training and assessment, a dynamic threshold that changes with time and data, and an integration framework and a corresponding algorithm and parameter formed after the integrated model training and assessment in a batch computing scenario. The knowledge base includes: a complex rule, an association relationship, a link propagation graph, a knowledge graph, a fault tree, and the like detected in each stage of comprehensive operation and maintenance model training and assessment. The mode in this part may be directly applied to real-time exception detection on real-time log data, or early fault prediction on batch log data. The incremental model includes: model parameter adjustment, model type adjustment, and the like for the existing operation and maintenance model to adapt to new data, and the incremental model includes both an increment of the single model and an increment of an integrated model.

In an embodiment, the automatic model training and assessment module is activated as required and executed in a classified manner by the operation and maintenance management and task execution module: a) The real-time data processing modeling and assessment is extracting real-time log data from a real-time database in the data storage module, processing the data according to a real-time task requirement, sorting the data in chronological order, performing time segmentation on the data according to a specific time window, and detecting and extracting an exception mode by using simple relationship determining and statistical analysis. b) The batch data processing modeling and assessment is selecting single model training and assessment, integrated model training and assessment, and incremental model training and assessment for the detected and extracted exception mode according to different operation and maintenance tasks and labeling data preparation. The single model training and assessment is mainly selecting an appropriate algorithm from a supervised model, an unsupervised model, and a semi-supervised model according to a task type and exception and fault labeling data. For example, an exception mode detection task has a small quantity of samples due to a variety of exception modes and a relatively low occurrence frequency, and therefore, is generally based on the unsupervised model. Moreover, fault location and early fault warning are generally based on the supervised model and supplemented by the semi-supervised model. The integrated model training and assessment is using an appropriate integration mode for a plurality of single models to obtain a stable optimal result in a case that a result of a single model is unstable when there are a plurality of task types. The incremental mode training and assessment is to maintain timely updating of an existing operation and maintenance model when new log data continuously emerges. Results of the automatic model training and assessment are stored in the data storage module in the form of models and knowledge bases. The models and knowledge bases are classified into the following four types according to respective application scenarios when being stored: a) a real-time model, mainly set to a simple exception rule and a static threshold parameter detected in log data in a real-time computing scenario; b) a general model, mainly set to: an algorithm and a corresponding parameter formed after the single model training and assessment, a dynamic threshold that changes with time and data, and an integration framework and a corresponding algorithm and parameter formed after the integrated model training and assessment in a batch computing scenario; c) a knowledge base, mainly including: a complex rule, an association relationship, a link propagation graph, a knowledge graph, a fault tree, and the like detected in each stage of comprehensive operation and maintenance model training and assessment; the mode in this part may be directly applied to real-time exception detection on real-time log data, or early fault prediction on batch log data; and d) an incremental model, including: performing incremental performance assessment on models obtained after the single model training and assessment, and the integrated model training and assessment, and retaining a model with relatively good incremental performance as an incremental model, to meet a requirement for adaptability of the entire intelligent operation and maintenance system to new data. When the incremental model is called, scheduled activation or triggered activation is selected according to whether the incremental model recalculates all data or performs incremental calculation only on newly added data.

The operation and maintenance management and task execution module implements unified management and task capabilities of the operation and maintenance system: task execution and result display of log querying and key performance indicator (KPI) monitoring, manual fault location and result display, exception rule filtering execution and result display, static threshold setting and execution result display, calling of automatic exception detection related models and result display, calling of a rapid fault location-related model and result display, calling of an early fault waring-related model and result display, activation of an automatic model training and assessment module and result management, and classified management and updating of a plurality of types of models. Compared with an ordinary operation and maintenance system, calling of an automatic exception detection-related model and result display, calling of a rapid fault location-related model and result display, calling of an early fault waring-related model and result display, activation of an automatic model training and assessment module and result management, and classified management and updating of a plurality of types of models are all new functions of the module.

In an embodiment, the operation and maintenance management and task execution module, on the one hand, provides functions, such as log querying, monitoring on a plurality of types of KPIs, exception detection, and fault warning, according to system configuration and model callability, and on the other hand, tracks a result of KPI monitoring, a result of exception rule filtering, a result of threshold exceeding, and a result of automatic exception mode detection, and calls, according to newly detected exception and fault data and existing exception and fault data labeling, one or more models or knowledge bases generated by the automatic model training and assessment module, to quickly locate a fault and provide a corresponding result. The operation and maintenance management and task execution module is responsible for outputting an operation and maintenance result.

The operation and maintenance management and task execution module continues monitoring acquisition of new log data, sequentially activates the exception and fault labeling module and the automatic model training and assessment module to generate new models and knowledge bases or update existing models and knowledge bases, and subsequently, iteratively performs operation and maintenance tasks, result checking, and the like, to implement self-updating, iteration, and evolution of system operation and maintenance capabilities.

The result checking module is configured to check an exception and a fault outputted from the operation and maintenance management and task execution module, and output an exception and a fault confirmed through checking to the exception and fault labeling module.

The result checking module is mainly responsible for manual checking and confirmation of an operation and maintenance result generated by an operation and maintenance managing module, and transfers an exception and a fault that are confirmed valid to the exception and fault labeling module as labeling data that is continuously expanded and accumulated in a data labeling manner.

The technical solution provided in the second embodiment of the present disclosure can efficiently perform automatic exception detection, rapid fault location, early fault warning, and the like under the conditions of diverse types and forms of log data and complex operation and maintenance requirements, and the entire intelligent operation and maintenance system can implement adaptive updating, self-iteration, and gradual evolution.

Third Embodiment

Figure 4:
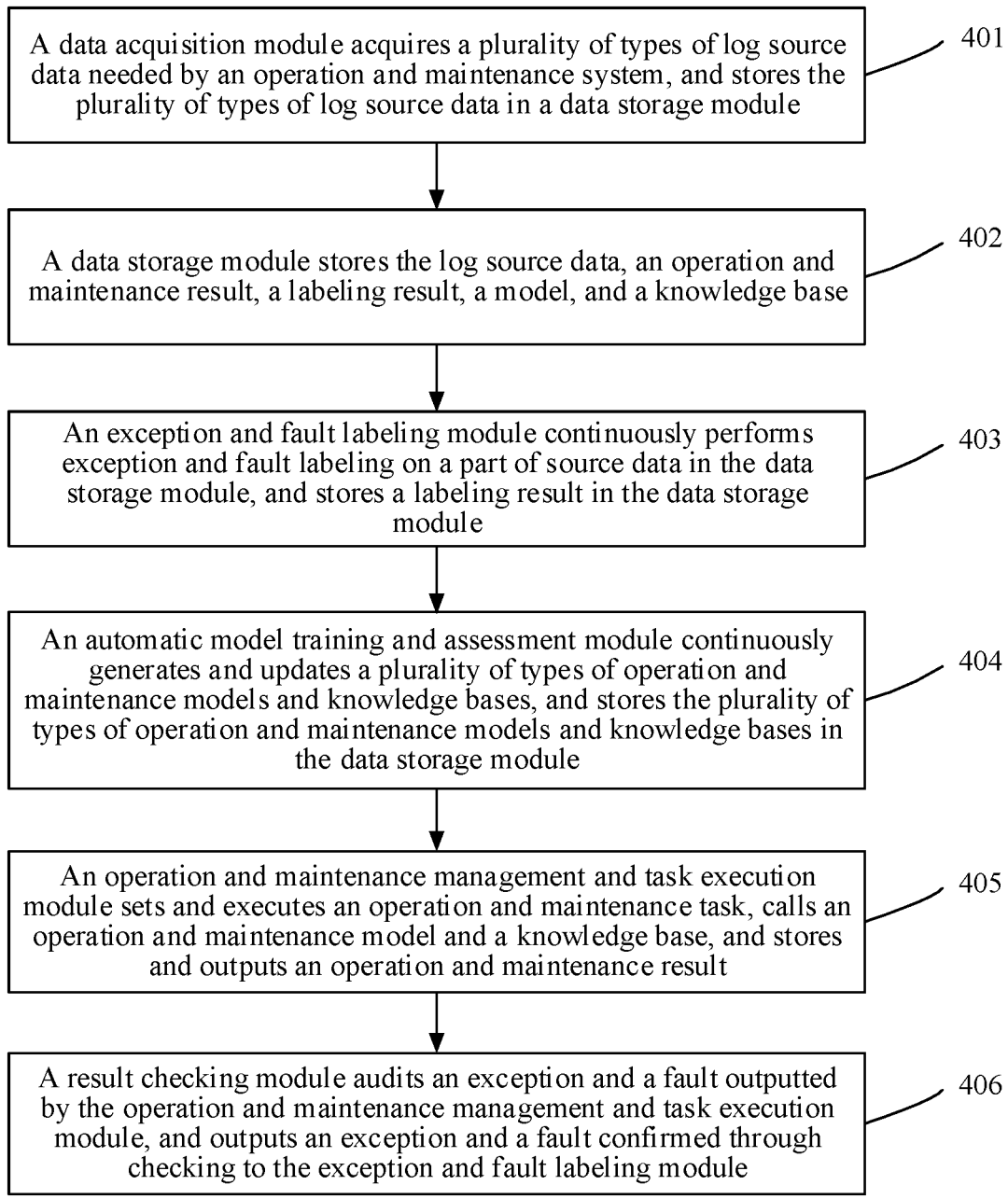
FIG. 4 is a schematic flowchart of an operation and maintenance method according to a third embodiment of the present disclosure.

FIG. 4 is a schematic flowchart of an operation and maintenance method according to the third embodiment of the present disclosure. As shown in FIG. 4, the operation and maintenance method includes step 401 to step 406.

Step 401: A data acquisition module acquires a plurality of types of log source data needed by an operation and maintenance system, and stores the plurality of types of log source data in a data storage module.

Step 402: A data storage module stores the log source data, an operation and maintenance result, a labeling result, a model, and a knowledge base.

Step 403: An exception and fault labeling module continuously performs exception and fault labeling on a part of source data in the data storage module, and stores a labeling result in the data storage module.

Step 404: An automatic model training and assessment module continuously generates and updates a plurality of types of operation and maintenance models and knowledge bases, and stores the plurality of types of operation and maintenance models and knowledge bases in the data storage module.

Step 405: An operation and maintenance management and task execution module sets and executes an operation and maintenance task, calls an operation and maintenance model and a knowledge base, and stores and outputs an operation and maintenance result.

In step 406. A result checking module checks an exception and a fault outputted from the operation and maintenance management and task execution module, and outputs an exception and a fault confirmed through checking to the exception and fault labeling module.

In an embodiment, the plurality of types of log source data acquired by the data acquisition module include: an application system log, an operating system resource status log, exception log data, streaming log data, a detailed operation and maintenance record, and third-party labeling data.

For the application system log and the operating system resource status log, the data acquisition module uses a data acquisition mode of scheduled scanning and batch transmission. For the exception log data and the streaming log data, the data acquisition module uses a data acquisition mode of real-time acquisition and real-time transmission. For the detailed operation and maintenance record and the third-party labeling data, the data acquisition module uses the data acquisition mode of scheduled scanning and batch transmission.

The source data on which the exception and fault labeling module performs exception and fault labeling includes: the detailed operation and maintenance record and the third-party labeling data stored in the data storage module, the exception and the fault confirmed through checking and outputted from the result checking module, and data used by the automatic model training and assessment module for training, test, and verification.

In an embodiment, manners in which the exception and fault labeling module performs exception and fault labeling include four manners, namely, a manual manner, a semi-manual manner, a semi-supervised learning manner, and a transfer learning manner.

The manual manner includes labeling a detailed operation and maintenance record extracted as required from the data storage module, according to a fault occurrence module, a fault type, and a fault cause.

The semi-manual manner includes labeling the exception and the fault confirmed through checking and outputted from the result checking module, according to the fault occurrence module, the fault type, and the fault cause.

The semi-supervised learning manner includes labeling the data used by the automatic model training and assessment module for training, test, and verification, by using a semi-supervised learning algorithm and some labeling samples that have been labeled.

The transfer learning manner includes learning from similar third-party labeling data by using a transfer learning technology, to generate labeling data needed by the operation and maintenance system.

In an embodiment, manners in which the automatic model training and assessment module generates and updates the plurality of types of operation and maintenance models and knowledge bases include: real-time data processing modeling and assessment, and batch data processing modeling and assessment.

The real-time data processing modeling and assessment includes: extracting real-time log data from a real-time database in the data storage module, processing the data according to a real-time task requirement, sorting the data in chronological order, performing time segmentation on the data according to a specific time window, and detecting and extracting an exception mode by using simple relationship determining and statistical analysis.

The batch data processing modeling and assessment includes: selecting single model training and assessment, integrated model training and assessment, and incremental model training and assessment for the detected and extracted exception mode according to different operation and maintenance tasks and labeling data preparation, to generate a plurality of types of operation and maintenance models and knowledge bases.

The single model training and assessment includes: selecting an appropriate algorithm from a supervised model, an unsupervised model, and a semi-supervised model according to a task type, exception and fault labeling data, and training, test, and verification data, to perform training and assessment to generate a single model.

The integrated model training and assessment includes: using an appropriate integration mode for a plurality of single models to obtain a stable optimal result in a case that a result of the single model training and assessment is unstable.

The incremental model training and assessment includes: performing model parameter updating, model retraining, and assessment updating operations on an existing operation and maintenance model after arrival of new log data.

In an embodiment, the plurality of types of operation and maintenance models and knowledge bases include: a real-time model, a general model, a knowledge base, and an incremental model.

The real-time model includes: a simple exception rule and a static threshold parameter detected in log data in a real-time computing scenario.

The general model includes: an algorithm and a corresponding parameter formed after the single model training and assessment; a dynamic threshold that changes with time and data; and an integration framework and a corresponding algorithm and parameter formed after the integrated model training and assessment; in a batch computing scenario.

The knowledge base includes: a complex rule, an association relationship, a link propagation graph, a knowledge graph, and a fault tree detected in each stage of comprehensive model training and assessment.

The incremental model includes: model parameter adjustment and model type adjustment for the existing operation and maintenance model to adapt to new data, and the incremental model includes both an increment of the single model and an increment of an integrated model.

The technical solution provided in the third Embodiment of the present disclosure is described below in detail through a specific embodiment.

Fourth Embodiment

Figure 5:
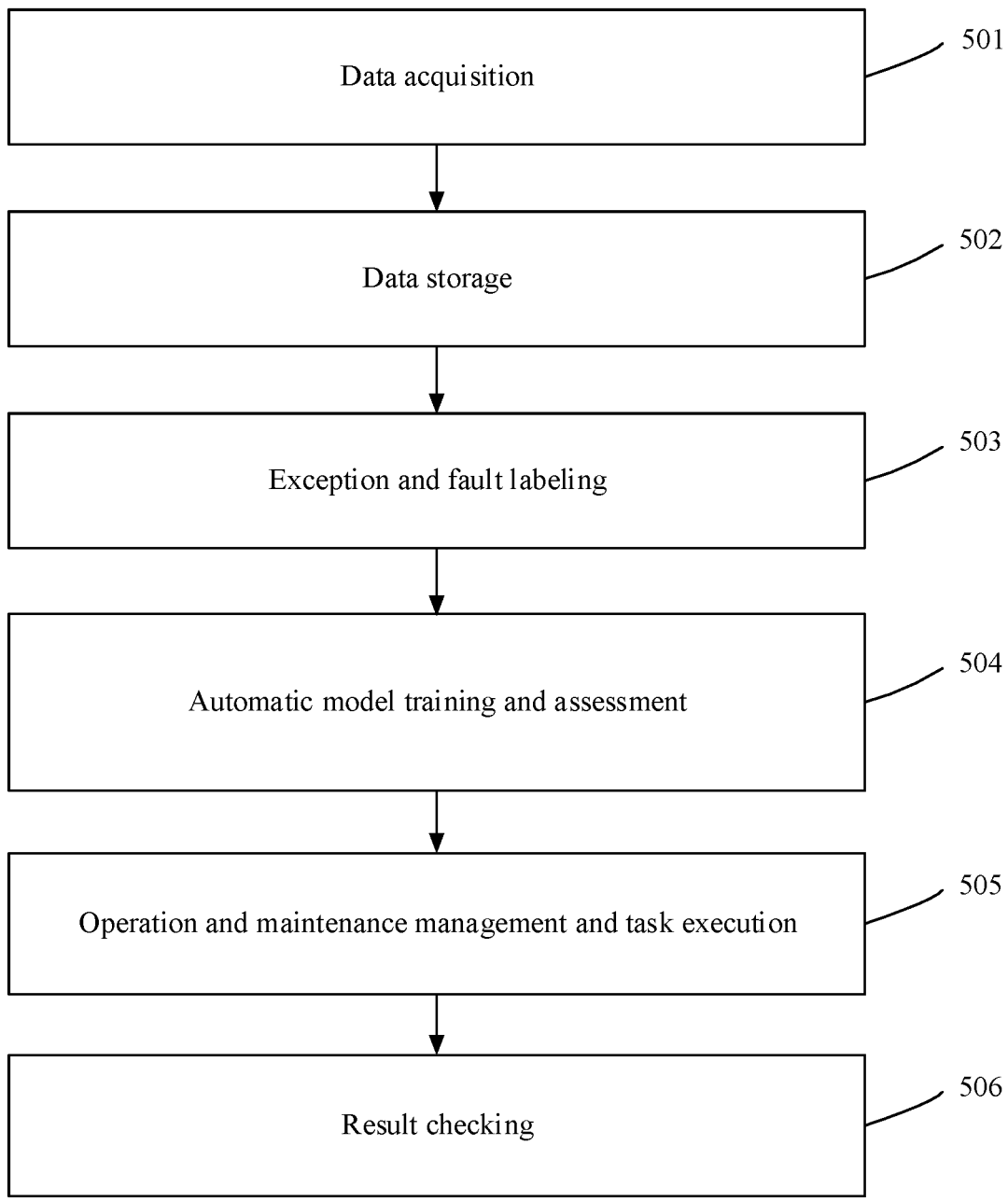
FIG. 5 is a schematic flowchart of an operation and maintenance method according to a fourth embodiment of the present disclosure.

FIG. 5 is a schematic flowchart of an operation and maintenance method according to the fourth embodiment of the present disclosure. As shown in FIG. 5, the operation and maintenance method includes step 501 to step 506.

Step 501: Perform data acquisition.

The data acquisition includes: 1. acquiring a real-time exception log, and acquiring in a real-time an exception log of an important application/operation in a work cluster; 2. acquiring an operating system resource status, and acquiring application system logs in batches; 4. acquiring third-party labeling data, which is set to supplement for a lack of exception and fault labeling data in the operation and maintenance system, and is mainly implemented by transferring external similar labeling data by using a transfer learning technology; 5. acquiring a detailed operation and maintenance record, which is directly used as labeling data of an exception and a fault of the operation and maintenance system; 6. acquiring streaming log data, which is mainly acquiring transactional and real-time transmission-type/operational streaming data in a big data environment in real time.

Step 502: Perform data storage.

The data storage includes: 1. storing log source data, generally in a file system; 2. storing a log analysis result, generally in a database or a data warehouse; 3. storing a labeling result, which is set to store a labeling result generated in the exception and fault labeling module; 4. storing a model and a knowledge base, which is set to store a plurality of types of models and knowledge bases generated in the automatic model training and assessment module.

Step 503: Perform exception and fault labeling.

The exception and fault labeling includes: 1. exception event labeling: confirming exception data acquired in the system, and labeling a real exception event; 2. fault type labeling: labeling fault data and a fault type acquired in the system; 3. labeling data transfer: forming exception and fault labeling data available to the system by using the transfer learning technology on the third-party labeling data.

Step 504: Perform automatic model training and assessment.

The automatic model training and assessment includes: 1. data preprocessing, which is responsible for data preparation in the automatic model training and assessment module, and includes, but not limited to, sample data extraction, data parsing, and format unification, feature extraction and construction, data imbalance processing, and the like; 2. single model training and assessment, which is selecting one or more algorithms from the unsupervised model training and assessment, the semi-supervised model training and assessment, and the supervised model training and assessment in the single model training and assessment according to a current status of log source data storage and a current status of labeling result storage in the data storage module, and a task type (automatic exception detection/rapid fault location/early fault warning), to perform training, test, and assessment, and store a formed algorithm and parameter, an association relationship, link propagation, a complex rule, a knowledge graph, a fault tree, and the like in the model and knowledge base of the data storage module as a model or a knowledge base; 3. integrated model training and assessment, where the integrated model training and assessment may be further selected, according to stability of the model and an assessment effect, for model optimization based on the single model training and assessment; 4. incremental model training and assessment, where an existing model and knowledge base needs to be updated as acquired data continuously increases, which can be implemented through incremental model training and assessment.

Step 505: Perform operation and maintenance management and task execution.

The operation and maintenance management and task execution includes: task execution and result display of log querying and KPI monitoring, manual fault location and result display, exception rule filtering execution and result display, static threshold setting and execution result display, calling of an automatic exception detection-related model and result display, calling of a rapid fault location-related model and result display, calling of an early fault waring-related model and result display, activation of an automatic model training and assessment module and result management, classified management and updating of a plurality of types of models, and the like.

Step 506: Perform result checking.

The result checking includes: checking an exception and fault-related result in the operation and maintenance management and task execution module. On one hand, all exceptions and faults obtained after checking are outputted. On the other hand, an exception and a fault that are confirmed are transferred to the exception and fault labeling module.

The above steps may be repeated cyclically without a fixed sequence.

The operation and maintenance method provided in the third embodiment and the fourth embodiment may be applied to the operation and maintenance system provided in the first embodiment and the second embodiment.

The technical solution provided in the third embodiment and the fourth embodiment of the present disclosure can efficiently perform automatic exception detection, rapid fault location, early fault warning, and the like under the conditions of diverse types and forms of log data and complex operation and maintenance requirements, and the entire intelligent operation and maintenance system can implement adaptive updating, self-iteration, and gradual evolution.

A person of ordinary skill in the art can understand that all or some of the steps, and functional modules/units in the system and apparatus in the method disclosed above may be implemented as software, firmware, hardware, and an appropriate combination thereof. In hardware implementations, the division between functional modules/units mentioned in the above description does not necessarily correspond to the division of physical components. For example, a physical component may have a plurality of functions, or a function or a step may be executed by several physical components cooperatively. Some or all components may be implemented as software executed by a processor, such as a digital signal processor or a microprocessor, or may be implemented as hardware, or may be implemented as an integrated circuit, such as a special-purpose integrated circuit. Such software may be distributed on a computer-readable medium, and the computer-readable medium may include a computer storage medium (or a non-transitory medium) and a communication medium (or a transitory medium). As known by a person of ordinary skill in the art that the term computer storage medium includes volatile and non-volatile media, and removable and non-removable media implemented in any method or technology configured to store information (such as computer-readable instructions, a data structure, a program module, or other data). The computer storage medium includes, but is not limited to, a random access memory (RAM), a read-only memory (ROM), an electrically erasable programmable read-only memory (EEPROM), a flash memory or another storage technology, a compact disc read-only memory (CD-ROM), a digital video disc (DVD) or other optical disc storage, a magnetic cartridge, a magnetic tape, disk storage, or another magnetic storage device, or any other medium that can be configured to store expected information and that can be accessed by a computer. In addition, it is known by a person of ordinary skill in the art that the communication medium generally includes computer-readable instructions, a data structure, a program module, or other data in a modulated data signal such as a carrier or another transmission mechanism, and may include any information transfer medium.

What is claimed is:

1. An operation and maintenance system applied to cloud computing and big data, comprising: a data acquisition device, a data storage device, an exception and fault labeling device, an automatic model training and assessment device, an operation and maintenance management and task execution device, and a result checking device that are interconnected, wherein
the data acquisition device is configured to: acquire a plurality of types of log source data needed by the operation and maintenance system, and store the plurality of types of log source data in the data storage device;
the data storage device is configured to: store the log source data, an operation and maintenance result, a labeling result, a model, and a knowledge base;
the exception and fault labeling device is configured to: continuously perform exception and fault labeling on a part of source data in the data storage device, and store a labeling result in the data storage device;
the automatic model training and assessment device is configured to: continuously generate and update a plurality of types of operation and maintenance models and knowledge bases, and store the plurality of types of operation and maintenance models and knowledge bases in the data storage device;
the operation and maintenance management and task execution device is configured to: set and execute an operation and maintenance task, call an operation and maintenance model and a knowledge base, and store and output an operation and maintenance result, and monitor acquisition of new log data, sequentially activate the exception and fault labeling device and the automatic model training and assessment device to generate new models and knowledge bases or update existing models and knowledge bases; and
the result checking device is configured to: check an exception and a fault outputted from the operation and maintenance management and task execution device, and output an exception and a fault confirmed through checking to the exception and fault labeling device.

2. The operation and maintenance system according to claim 1, wherein
the plurality of types of log source data acquired by the data acquisition device comprise: an application system log, an operating system resource status log, exception log data, streaming log data, a detailed operation and maintenance record, and third-party labeling data, wherein the data acquisition device is configured to use a data acquisition mode of scheduled scanning and batch transmission for the application system log and the operating system resource status log;
the data acquisition device is configured to use a data acquisition mode of real-time acquisition and real-time transmission for the exception log data and the streaming log data; and
the data acquisition device is configured to use the data acquisition mode of scheduled scanning and batch transmission for the detailed operation and maintenance record and the third-party labeling data; and
the source data on which the exception and fault labeling device performs exception and fault labeling comprises: the detailed operation and maintenance record and the third-party labeling data stored in the data storage device, the exception and the fault confirmed through checking and outputted from the result checking device, and data used by the automatic model training and assessment device for training, test, and verification.

3. The operation and maintenance system according to claim 1, wherein
manners in which the exception and fault labeling device performs exception and fault labeling comprise: a manual manner, a semi-manual manner, a semi-supervised learning manner, and a transfer learning manner;
the manual manner includes: labeling a detailed operation and maintenance record extracted as required from the data storage device, according to a fault occurrence device, a fault type, and a fault cause;
the semi-manual manner includes: labeling the exception and the fault confirmed through checking and outputted from the result checking device, according to the fault occurrence device, the fault type, and the fault cause;
the semi-supervised learning manner includes: labeling the data used by the automatic model training and assessment device for training, test, and verification, by using a semi-supervised learning algorithm and some labeling samples that have been labeled; and
the transfer learning manner includes: learning from similar third-party labeling data by using a transfer learning technology, to generate labeling data needed by the operation and maintenance system.

4. The operation and maintenance system according to claim 1, wherein
manners in which the automatic model training and assessment device generates and updates the plurality of types of operation and maintenance models and knowledge bases comprise: real-time data processing modeling and assessment, and batch data processing modeling and assessment;
the real-time data processing modeling and assessment includes: extracting real-time log data from a real-time database in the data storage device, processing the data according to a real-time task requirement, sorting the data in chronological order, performing time segmentation on the data according to a specific time window, and detecting and extracting an exception mode by using relationship determining and statistical analysis;
the batch data processing modeling and assessment includes: selecting single model training and assessment, integrated model training and assessment, and incremental model training and assessment for the detected and extracted exception mode according to different operation and maintenance tasks and labeling data preparation, to generate the plurality of types of operation and maintenance models and knowledge bases; wherein the single model training and assessment comprises: selecting a corresponding model from a supervised model, an unsupervised model, and a semi-supervised model according to a task type, exception and fault labeling data, and training, test, and verification data, to perform training and assessment to generate a single model;

the integrated model training and assessment comprises: using a corresponding integration mode for a plurality of single models to obtain a stable result in a case that a result of the single model training and assessment is unstable; and the incremental model training and assessment comprises: performing model parameter updating, model retraining, and assessment updating operations on an existing operation and maintenance model after arrival of new log data.

5. The operation and maintenance system according to claim 4, wherein the plurality of types of operation and maintenance models and knowledge bases comprise: a real-time model, a general model, a knowledge base, and an incremental model; wherein the real-time model comprises: a simple exception rule and a static threshold parameter detected in log data in a real-time computing scenario;

the general model comprises: an algorithm and a corresponding parameter formed after the single model training and assessment, a dynamic threshold that changes with time and data, and an integration framework and a corresponding algorithm and parameter formed after the integrated model training and assessment in a batch computing scenario;

the knowledge base comprises: a complex rule, an association relationship, a link propagation graph, a knowledge graph, and a fault tree detected in each stage of comprehensive model training and assessment; and the incremental model comprises: model parameter adjustment and model type adjustment for the existing operation and maintenance model to adapt to new data; and the incremental model comprises an increment of the single model and an increment of an integrated model.

6. An operation and maintenance method applied to cloud computing and big data, comprising:

acquiring a plurality of types of log source data needed by an operation and maintenance system, and storing the plurality of types of log source data in a data storage device, by a data acquisition device;

storing, by the data storage device, the log source data, an operation and maintenance result, a labeling result, a model, and a knowledge base;

continuously performing exception and fault labeling on a part of source data in the data storage device, and storing a labeling result in the data storage device, by an exception and fault labeling device;

continuously generating and updating a plurality of types of operation and maintenance models and knowledge bases, and storing the plurality of types of operation and maintenance models and knowledge bases in the data storage device, by an automatic model training and assessment device;

setting and executing an operation and maintenance task, calling an operation and maintenance model and a knowledge base, and storing and outputting an operation and maintenance result, and monitoring acquisition of new log data, sequentially activating the exception and fault labeling device and the automatic model training and assessment device to generate new models and knowledge bases or update existing models and knowledge bases, by an operation and maintenance management and task execution device; and checking an exception and a fault outputted from the operation and maintenance management and task execution device, and outputting an exception and a fault confirmed through checking to the exception and fault labeling device, by a result checking device.

7. The operation and maintenance method according to claim 6, wherein the plurality of types of log source data acquired by the data acquisition device comprise: an application system log, an operating system resource status log, exception log data, streaming log data, a detailed operation and maintenance record, and third-party labeling data, wherein for the application system log and the operating system resource status log, the data acquisition device uses a data acquisition mode of scheduled scanning and batch transmission;

for the exception log data and the streaming log data, the data acquisition device uses a data acquisition mode of real-time acquisition and real-time transmission; and for the detailed operation and maintenance record and the third-party labeling data, the data acquisition device uses the data acquisition mode of scheduled scanning and batch transmission; and the source data on which the exception and fault labeling device performs exception and fault labeling comprises: the detailed operation and maintenance record and the third-party labeling data stored in the data storage device, the exception and the fault confirmed through checking and outputted from the result checking device, and data used by the automatic model training and assessment device for training, test, and verification.

8. The operation and maintenance method according to claim 6, wherein manners in which the exception and fault labeling device performs exception and fault labeling comprise: a manual manner, a semi-manual manner, a semi-supervised learning manner, and a transfer learning manner;

the manual manner includes: labeling a detailed operation and maintenance record extracted as required from the data storage device, according to a fault occurrence device, a fault type, and a fault cause;

the semi-manual manner includes: labeling the exception and the fault confirmed through checking and outputted from the result checking device, according to the fault occurrence device, the fault type, and the fault cause;

the semi-supervised learning manner includes: labeling the data used by the automatic model training and assessment device for training, test, and verification, by using a semi-supervised learning algorithm and some labeling samples that have been labeled; and the transfer learning manner includes: learning from similar third-party labeling data by using a transfer learning technology, to generate labeling data needed by the operation and maintenance system.

9. The operation and maintenance method according to claim 6, wherein manners in which the automatic model training and assessment device generates and updates the plurality of types of operation and maintenance models and knowledge bases comprise: real-time data processing modeling and assessment, and batch data processing modeling and assessment;

the real-time data processing modeling and assessment includes: extracting real-time log data from a real-time database in the data storage device, processing the data according to a real-time task requirement, sorting the data in chronological order, performing time segmentation on the data according to a specific time window, and detecting and extracting an exception mode by using relationship determining and statistical analysis;

the batch data processing modeling and assessment includes: selecting single model training and assessment, integrated model training and assessment, and incremental model training and assessment for the detected and extracted exception mode according to different operation and maintenance tasks and labeling data preparation, to generate the plurality of types of operation and maintenance models and knowledge bases; wherein the single model training and assessment comprises: selecting a corresponding model from a supervised model, an unsupervised model, and a semi-supervised model according to a task type, exception and fault labeling data, and training, test, and verification data, to perform training and assessment to generate a single model;

the integrated model training and assessment comprises: using a corresponding integration mode for a plurality of single models to obtain a stable result in a case that a result of the single model training and assessment is unstable; and the incremental model training and assessment comprises: performing model parameter updating, model retraining, and assessment updating operations on an existing operation and maintenance model after arrival of new log data.

10. The operation and maintenance method according to claim 9, wherein the plurality of types of operation and maintenance models and knowledge bases comprise: a real-time model, a general model, a knowledge base, and an incremental model; wherein the real-time model comprises: a simple exception rule and a static threshold parameter detected in log data in a real-time computing scenario;

the general model comprises: an algorithm and a corresponding parameter formed after the single model training and assessment, a dynamic threshold that changes with time and data, and an integration framework and a corresponding algorithm and parameter formed after the integrated model training and assessment in a batch computing scenario;

the knowledge base comprises: a complex rule, an association relationship, a link propagation graph, a knowledge graph, and a fault tree detected in each stage of comprehensive model training and assessment; and the incremental model comprises: model parameter adjustment and model type adjustment for the existing operation and maintenance model to adapt to new data, and the incremental model comprises an increment of the single model and an increment of an integrated model.

11. A non-transitory computer readable storage medium storing instructions which, when executed by a processor, cause the processor to perform a method, applied to cloud computing and big data-comprising:

acquiring a plurality of types of log source data needed by an operation and maintenance system, and storing the plurality of types of log source data in a data storage device, storing the log source data, an operation and maintenance result, a labeling result, a model, and a knowledge base;

continuously performing exception and fault labeling on a part of source data in the data storage device, and storing a labeling result in the data storage device;

continuously generating and updating a plurality of types of operation and maintenance models and knowledge bases, and storing the plurality of types of operation and maintenance models and knowledge bases in the data storage device;

setting and executing an operation and maintenance task, calling an operation and maintenance model and a knowledge base, and storing and outputting an operation and maintenance result, and monitoring acquisition of new log data, sequentially activating the exception and fault labeling device and the automatic model training and assessment device to generate new models and knowledge bases or update existing models and knowledge bases; and checking an exception and a fault outputted from the operation and maintenance management and task execution device, and outputting an exception and a fault confirmed through checking to the exception and fault labeling device.

12. The non-transitory computer readable storage medium according to claim 11, wherein the plurality of types of log source data acquired comprise: an application system log, an operating system resource status log, exception log data, streaming log data, a detailed operation and maintenance record, and third-party labeling data;

wherein the method further comprises:

using a data acquisition mode of scheduled scanning and batch transmission for the application system log and the operating system resource status log;

using a data acquisition mode of real-time acquisition and real-time transmission for the exception log data and the streaming log data, the data acquisition device; and using the data acquisition mode of scheduled scanning and batch transmission for the detailed operation and maintenance record and the third-party labeling data, the data acquisition device;

wherein the source data for exception and fault labeling comprises: the detailed operation and maintenance record and the third-party labeling data stored, the exception and the fault confirmed through checking and outputted, and data used for training, test, and verification.

13. The non-transitory computer readable storage medium according to claim 11, wherein manners for performing exception and fault labeling comprise: a manual manner, a semi-manual manner, a semi-supervised learning manner, and a transfer learning manner;

the manual manner includes: labeling a detailed operation and maintenance record extracted as required, according to a fault occurrence device, a fault type, and a fault cause;

the semi-manual manner includes: labeling the exception and the fault confirmed through checking and outputted, according to the fault occurrence device, the fault type, and the fault cause;

the semi-supervised learning manner includes: labeling the data used for training, test, and verification, by using a semi-supervised learning algorithm and some labeling samples that have been labeled; and the transfer learning manner includes: learning from similar third-party labeling data by using a transfer learning technology, to generate labeling data needed by an operation and maintenance system.

14. The non-transitory computer readable storage medium according to claim 11, wherein manners for generating and updating the plurality of types of operation and maintenance models and knowledge bases comprise: real-time data processing modeling and assessment, and batch data processing modeling and assessment;

the real-time data processing modeling and assessment includes: extracting real-time log data from a real-time database, processing the data according to a real-time task requirement, sorting the data in chronological order, performing time segmentation on the data according to a specific time window, and detecting and extracting an exception mode by using relationship determining and statistical analysis;

the batch data processing modeling and assessment includes: selecting single model training and assessment, integrated model training and assessment, and incremental model training and assessment for the detected and extracted exception mode according to different operation and maintenance tasks and labeling data preparation, to generate the plurality of types of operation and maintenance models and knowledge bases; wherein the single model training and assessment comprises: selecting a corresponding model from a supervised model, an unsupervised model, and a semi-supervised model according to a task type, exception and fault labeling data, and training, test, and verification data, to perform training and assessment to generate a single model;

the integrated model training and assessment comprises: using a corresponding integration mode for a plurality of single models to obtain a stable result in a case that a result of the single model training and assessment is unstable; and the incremental model training and assessment comprises: performing model parameter updating, model retraining, and assessment updating operations on an existing operation and maintenance model after arrival of new log data.

15. The non-transitory computer readable storage medium according to claim 11, wherein the plurality of types of operation and maintenance models and knowledge bases comprise: a real-time model, a general model, a knowledge base, and an incremental model; wherein the real-time model comprises: a simple exception rule and a static threshold parameter detected in log data in a real-time computing scenario;

the general model comprises: an algorithm and a corresponding parameter formed after the single model training and assessment, a dynamic threshold that changes with time and data, and an integration framework and a corresponding algorithm and parameter formed after the integrated model training and assessment in a batch computing scenario;

the knowledge base comprises: a complex rule, an association relationship, a link propagation graph, a knowledge graph, and a fault tree detected in each stage of comprehensive model training and assessment; and the incremental model comprises: model parameter adjustment and model type adjustment for the existing operation and maintenance model to adapt to new data, and the incremental model comprises an increment of the single model and an increment of an integrated model.

* * * * *